May 9, 1944.  J. M. PAGE, JR  2,348,408
CATALYST RECOVERY
Filed Nov. 30, 1940
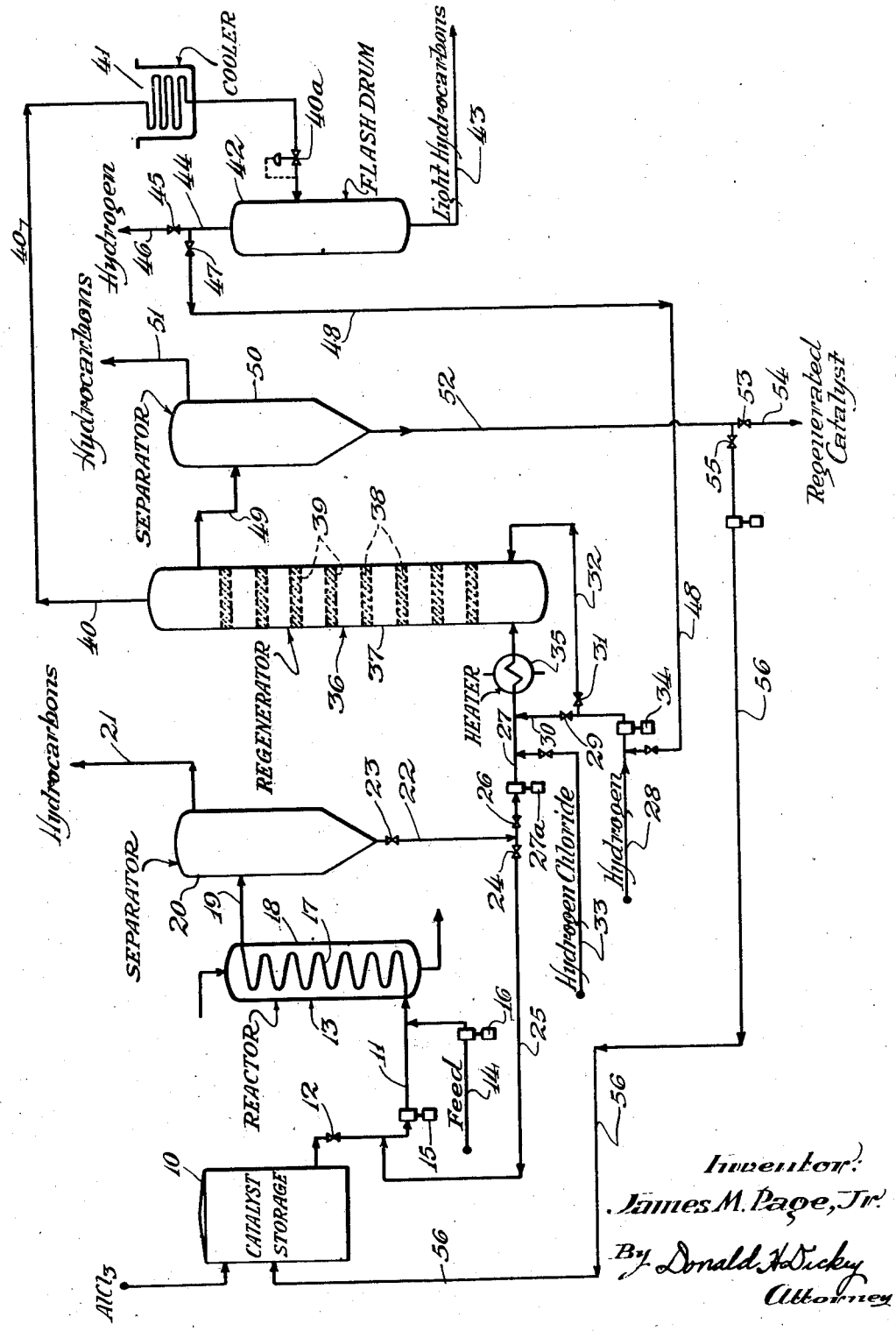
Inventor:
James M. Page, Jr.
By Donald H. Dickey
Attorney Patented May 9, 1944

2,348,408

UNITED STATES PATENT OFFICE 2,348,408

CATALYST RECOVERY

James M. Page, Jr., Chicago, Ill., assignor to Standard Oil Company, Chicago, Ill., a corporation of Indiana Application November 30, 1940, Serial No. 368,003

7 Claims. (Cl. 196—53)

This invention relates to the recovery of aluminum halide catalysts and relates more particularly to the reactivation of aluminum halide catalysts degraded during the conversion of hydrocarbons.

The use of aluminum halide catalysts for the conversion of hydrocarbons, either alone or in the presence of such added promoters as hydrogen halides, organic halides, etc., is well known. Aluminum chloride has been used, for example, as a catalyst to promote the cracking of hydrocarbons, particularly high molecular weight hydrocarbons such as those found in kerosene, gas oils, etc.; the polymerization of normally gaseous olefins to form higher molecular weight olefins of gasoline or lubricating oil boiling range; the alkylation of isoparaffinic or aromatic hydrocarbons with olefinic hydrocarbons throughout a wide boiling range; the isomerization of straight-chain hydrocarbons to branched-chain hydrocarbons; and numerous additional conversion processes wherein hydrocarbons or mixtures of hydrocarbons, particularly those of petroleum origin are converted to other hydrocarbons of commercially more desirable characteristics as regards configuration, boiling range, octane number, oxidation stability, etc.

In practically all of these processes the aluminum halide which originally was granular and dry is gradually converted to a sludge-like mass, passing through various stages from a pale colored, thin oil to highly resinous black, tarry or at times coky material. The actual mechanism of this conversion is not understood but apparently the catalyst forms complex compounds with the hydrocarbon undergoing treatment, the complexes building up as the treatment continues or as the severity of the conditions is increased. Generally speaking, the hydrocarbon portion of the complex is highly unsaturated but the exact chemical structure defies accurate analysis. Throughout this specification and the claims the term "aluminum halide-hydrocarbon sludge" is intended to designate the metal halide-organic complex formed by the reaction of an aluminum halide with a hydrocarbon or hydrocarbon mixture.

It has been established that fresh aluminum chloride or aluminum bromide is extremely active as a catalyst and that when used for the conversion of hydrocarbons it often carries the reactions to extremes and introduces undesirable side reactions which cannot be controlled. Such violent activity is not too deleterious in such conversion processes as catalytic cracking but in those reactions where a milder catalytic action is required, such as alkylation, isomerization and polymerization processes, it is desirable to modify the catalytic activity of the aluminum halide catalyst. It has been discovered that in the light "red oil" complexes, which are quite mobile and fluid, the catalytic activity of the aluminum halide is sufficiently modified or masked to be acceptable as a catalyst but still retains sufficient activity to promote the desired hydrocarbon conversion. These "red oil" complexes are apparently the result of the interaction of aluminum halide and hydrocarbons and while their actual composition, as stated before, cannot be definitely determined, generally speaking, they contain from about 10 to about 65% hydrocarbons attached to the aluminum halide.

Many methods have been suggested for the recovery of aluminum halide from an aluminum halide sludge. Such methods include distillation, coking, destructive hydrogenation of the hydrocarbon complex to yield aluminum halides and hydrocarbons, decomposition of the aluminum halide to aluminum oxide and a halogen, etc. In all such methods the primary object is to recover the aluminum halide free of the hydrocarbons with which it formed a complex material and to obtain the substantially pure metal halide.

It is an object of my invention to provide a process for the reactivation of aluminum halide-hydrocarbon sludge. Another object of my invention is to provide a process for the restoration of catalytic activity to an aluminum halide catalyst spent as regards hydrocarbon conversion. A further object of this invention is to provide a process for the recovery of active catalytic material from an aluminum halide-hydrocarbon sludge. My invention also has as an additional object the provision of a process for regenerating a spent aluminum halide catalyst to a point wherein it may be reused in the conversion of hydrocarbon material. Additional objects and advantages will become apparent as the description of my invention proceeds, read in conjunction with the accompanying drawing which forms a part of this specification and which is a simple flow diagram of one form of apparatus suitable for carrying out an embodiment of my process.

Briefly stated, I have found that the catalytic activity of an aluminum halide-hydrocarbon sludge can be substantially restored by contacting it with hydrogen in the presence of a hydrogenation catalyst under conditions of temperature and pressure which promote the reactivation. It should be stated emphatically that my process does not contemplate the recovery of aluminum halide as such, substantially or entirely free of hydrocarbon material, but is directed to restoring activity to the catalyst in the form of a mobile, fluid, aluminum halide-hydrocarbon complex. During the treatment a portion of the organic material in the sludge apparently is displaced, leaving the active fluid material available for catalytic conversion. Although my process is applicable to the restoration of spent aluminum halide catalyst from any hydrocarbon conversion process, it is particularly suitable for the recovery of catalyst suitable for use in such processes as alkylation, isomerization, etc., which require a modified or milder catalyst than the pure aluminum halide.

Referring now to the drawing, an active aluminum halide-hydrocarbon complex is withdrawn from catalyst storage tank 10 through line 11 by opening valve 12 therein and directed to reactor 13. Feed stock enters from line 14 which joins line 11 and commingles with the catalyst. As feed stock I can employ any suitable hydrocarbon or hydrocarbon mixture which it may be desirable to convert to more valuable products. For example, the feed stock can be normally gaseous and/or liquid hydrocarbons comprising essentially straight-chain or only slightly branched-chain paraffins which can be isomerized to a highly branched configuration under the proper operating conditions; the feed stock can also be a mixture of olefinic and paraffinic hydrocarbons—liquid or gaseous, and containing a substantial amount of isoparaffinic hydrocarbons therein, which is suitable for an alkylation reaction; or the feed stock can be predominantly olefinic in character, for polymerization to hydrocarbons of higher molecular weight. Broadly speaking, I prefer to employ aromatic-free feed stocks, since aromatic hydrocarbons appear to degrade the catalyst and reduce its activity much more rapidly than do naphthenic or aliphatic hydrocarbons.

The feed stock can include with the hydrocarbon materials any promoters to be used in facilitating the reaction. Many of the reactions employing aluminum halides, and particularly aluminum halide-hydrocarbon complexes as a catalyst, are desirably carried out in the presence of a hydrogen halide, such as hydrogen chloride or hydrogen bromide, or in the presence of a compound yielding a hydrogen halide under the conditions of operation, such as organic halides, etc. These compounds apparently promote the ease or smoothness with which the reaction will progress, and are suitably included with the feed stock, or they can be added separately, by means not shown. Hydrogen is often added during conversion processes involving aluminum halide-type catalysts, and this can also be included with the feed stock at the desired pressure, or can be added separately by means not shown.

Pump 15 in line 11 and pump 16 in line 14 aid in commingling the catalyst and feed and directing it to reactor 13. A mixing device can be inserted at the juncture of the two lines if desired. As shown, reactor 13 has a tubular coil 17 within a vessel 18, which can be maintained at any desired temperature. The turbulent flow through the coil serves to keep the reactants thoroughly intermingled, assuring intimate contact, and the time of contact can be controlled both by the rate of flow and the length of coil employed. Such a reactor is equally applicable to alkylation, isomerization or polymerization reactions. Other suitable reactors can be substituted, however, without departing from the scope of my invention, and can include such means as a jacketed vessel with mechanical stirrers, jet injectors, orifice mixers, etc., or a packed tower; in fact any means for insuring intimate contact between the reactants and for maintaining a desired temperature can be employed.

Converted hydrocarbons, unconverted feed stock and catalyst pass from reactor 13 via line 19 to separator 20 wherein the catalyst and the hydrocarbons are settled and separated, the hydrocarbons being withdrawn overhead through line 21 and directed to a fractionation system (not shown) for recovery of desired products, and recycle, if desired, of unconverted feed stock.

The catalyst is withdrawn from separator 20 through line 22 controlled by valve 23. In some instances the catalyst is only partially spent during the course of the reaction, and therefore it can be recycled to the reactor by opening valve 24 in line 25 which joins line 11, where it can replace in whole or in part the fresh catalyst from storage tank 10. Eventually, however, the catalyst becomes so viscous and heavy that it is no longer effective for promoting the conversion of hydrocarbons and, accordingly, the spent catalyst is directed from line 22 to a regeneration system by opening valve 26 in line 27. Hydrogen is introduced from an outside source (not shown) via line 28, and can be mixed directly with the spent catalyst by opening valve 29 in line 30 which joins line 27, or it can be added to the regeneration reactor separately by opening valve 31 in line 32. The regeneration is carried out at pressures within the range of from about 40 to about 400 atmospheres, which pressure can be supplied by pump 27a and compressor 34 in lines 27 and 28, respectively.

The aluminum halide-hydrocarbon sludge and hydrogen are heated to temperatures within the range of from about 200° F. to about 500° F., depending to a large extent upon the hydrogenation catalyst employed, and accordingly pass through heater 35. In the event that the catalyst sludge and hydrogen are injected separately into the regeneration reactor, means for heating each stream must be provided. If desired, hydrogen chloride can be added to suppress any tendency toward aluminum or aluminum oxide formation, and can be added through line 33.

Regeneration reactor 36 comprises a drum 37, the interior of which is filled with catalytic material 38 which can be packed into the drum in any suitable manner, as for example in small lumps or on trays 39, as illustrated. As catalysts I can employ any suitable hydrogenation catalyst, such as the oxides or sulfides of the heavy solid metals of the sixth group of the periodic table, their mixtures with each other or with other compounds, such as alumina, magnesia, zinc oxide, aluminum sulfide, etc. I particularly prefer a rugged type catalyst, of which molybdenum sulfide is an excellent example. In place of a regeneration reactor of the type described, I can add the hydrogenation catalyst directly to the sludge stream (by means not shown) together with the hydrogen and any hydrogen chloride used. In this event, vessel 37 becomes a "soaking drum" or other means for obtaining the desired contact time, or can be a pipe still or other reactor in which the regeneration takes place. The hydrogenation catalyst can be left suspended in the regenerated aluminum halide complex catalyst, or can be removed therefrom after regeneration by employing a filter, centrifuge, or other well-known means for removing solids from liquids.

The catalyst sludge and hydrogen which is substantially all in the liquid phase pass upward through the catalyst bed, the contact time varying, for example, from about three hours to six hours, depending to a large degree upon the extent of degradation of the aluminum halide catalyst and the other conditions employed. The unused hydrogen, which should be present in considerable excess, passes overhead through line 40, together with any light hydrocarbons, such as methane and ethane which may have been formed during the regeneration. The gaseous fraction is cooled in cooler 41, and directed to flash drum 42, in which the hydrogen is separated from the hydrocarbon material. A pressure-reducing valve 40a can be inserted in line 40 prior to drum 42. The light hydrocarbons are withdrawn through line 43, while the hydrogen passes out through line 44 and can be withdrawn for use elsewhere by opening valve 45 in line 46 but preferably is recycled to the regeneration step by opening valve 47 in line 48 which joins line 28.

Regenerated catalyst plus normally liquid hydrocarbons formed during the reaction pass from regenerator 36 via line 49 to separator 50, the hydrocarbons passing overhead therefrom through line 51 while the regenerated catalyst is withdrawn through line 52. The regenerated aluminum halide-hydrocarbon complex, in a fluid, mobile state, can be withdrawn for use in any other process or for separate storage by opening valve 53 in line 54, but preferably is returned to storage tank 10 for further use in reactor 13 by opening valve 55 in line 56.

The exact temperature used for regeneration will depend to some extent upon the degree of use to which the catalyst has been subjected in the hydrocarbon conversion. In other words, if the catalyst has been used to such an extent that it is substantially completely exhausted so far as catalytic activity is concerned, and has acquired high density or has even become resinous or tarry in appearance, then more extreme conditions as well as longer periods of reactivation must necessarily be employed. On the other hand, if the catalyst is to be subjected to reactivation when it has fallen below a certain optimum conversion constant, then milder conditions and shorter times of reactivation are suitable. If the sludge is too heavy or too resinous it can be thinned or diluted with mobile, thin sludge suitably held in separate storage for this purpose.

As a specific example of my process, a light aromatic-free naphtha feed is treated with a fresh aluminum chloride-hydrocarbon complex for a period of fifteen hours at a temperature of about 330° F. for the isomerization of straight-chain paraffins to isoparaffins. At the end of this period the catalytic activity is sufficiently diminished so that the catalyst is no longer effective for promoting the reaction. The spent catalyst is then passed with hydrogen over a molybdenum sulfide catalyst held on trays, using an initial hydrogen pressure of about 350 atmospheres. A temperature of about 450° F. is employed, or at least as high a temperature as possible without coking or cracking the complex, and a contact time of about three hours. The regenerated active fluid catalyst can now be returned to the isomerization reaction for the further conversion of the light naphtha feed.

By the use of hydrogen the aluminum halide-hydrocarbon sludge can be restored to an active, fluid state similar in appearance and effectiveness to the fresh "red oil" complex, the virtues of which have been referred to earlier in this specification. Under the influence of hydrogenation catalysts, and particularly those of the "rugged" type, the reactivation is more rapid and more complete than might otherwise be the case, and extremely viscous or tarry sludge can be easily and quickly regenerated to a light colored low viscosity aluminum halide hydrocarbon complex. Moreover, under the conditions herein set forth, there is no appreciable loss of material as free aluminum or aluminum oxide, as occurs in destructive hydrogenation, coking, distillation, etc.

Although I have shown one embodiment of my invention, it should be understood that this is by way of illustration and not by way of limitation. Various details, such as pumps, automatic controls, heat exchangers, etc., have been omitted for the sake of simplicity and will be readily supplied by one skilled in the art wishing to practice my invention commercially.

I claim:

1. A process for the recovery of a catalytically active aluminum halide-hydrocarbon complex from a comparatively inactive aluminum halide-hydrocarbon sludge formed during the conversion of hydrocarbons in the presence of an aluminum halide catalyst which comprises treating said aluminum halide-hydrocarbon sludge with hydrogen in the presence of an active hydrogenation catalyst other than any catalytically active aluminum halide which may be present in said sludge and in the substantial absence of other regenerating agents under conditions of temperature and pressure adapted to promote the restoration of said aluminum halide-hydrocarbon sludge to a catalytically active fluid complex state.

2. A process for the recovery of a catalytically active aluminum halide-hydrocarbon complex from a comparatively inactive aluminum halide-hydrocarbon sludge formed during the conversion of hydrocarbons in the presence of an aluminum halide catalyst which comprises treating said aluminum halide-hydrocarbon sludge with hydrogen in the presence of an active hydrogenation catalyst other than any catalytically active aluminum halide which may be present in said sludge and in the substantial absence of other regenerating agents at a temperature within the approximate range of from 200° to 500° F. and under pressure adapted to promote the restoration of said aluminum halide-hydrocarbon sludge to a catalytically active fluid complex state.

3. A process for the recovery of a catalytically active aluminum halide-hydrocarbon complex from a comparatively inactive aluminum halide-hydrocarbon sludge formed during the conversion of hydrocarbons in the presence of an aluminum halide catalyst which comprises treating said aluminum halide-hydrocarbon sludge with hydrogen in the presence of an active hydrogenation catalyst other than any catalytically active aluminum halide which may be present in said sludge and in the substantial absence of other regenerating agents under a pressure within the approximate range of from 40 to 400 atmospheres and at a temperature adapted to promote the restoration of said aluminum halide-hydrocarbon sludge to a catalytically active fluid complex state.

4. A process for the recovery of a catalytically active aluminum halide-hydrocarbon complex from a comparatively inactive aluminum halide-hydrocarbon sludge formed during the conversion of hydrocarbons in the presence of an aluminum halide catalyst which comprises treating said aluminum halide-hydrocarbon sludge with hydrogen in the presence of an active hydrogenation catalyst selected from the group comprising the oxides and sulfides of the heavy metals of the sixth group of the periodic system under such conditions of temperature and pressure that there is no substantial vaporization of aluminum chloride but that there is a restoration of said aluminum halide-hydrocarbon complex to a catalytically active fluid state.

5. A process for the recovery of a catalytically active aluminum halide-hydrocarbon complex from a comparatively inactive aluminum halide-hydrocarbon sludge formed during the conversion of hydrocarbons in the presence of an aluminum halide catalyst which comprises treating said aluminum halide-hydrocarbon sludge with hydrogen in the presence of an active hydrogenation catalyst selected from the group comprising the oxides and sulfides of the heavy metals of the sixth group of the periodic system at temperatures within the range of from about 200° F. to 500° F., at pressures within the range of from about 40 to 400 atmospheres whereby said aluminum halide-hydrocarbon sludge is converted to a catalytically active fluid aluminum halide-hydrocarbon complex.

6. In a process including reacting a hydrocarbon material with an aluminum halide-hydrocarbon complex wherein said complex becomes degraded and reduced in catalytic activity, the improvement comprising treating said degraded complex with hydrogen in the presence of an active hydrogenation catalyst other than any catalytically active aluminum halide which may be present in said sludge and in the substantial absence of other regenerating agents under conditions whereby the catalytic activity of said complex is substantially restored.

7. In a process including reacting a hydrocarbon material with an aluminum halide-hydrocarbon complex wherein said complex becomes degraded and reduced in catalytic activity, the improvement comprising separating said degraded catalytic complex from said hydrocarbon material, treating said separated complex with hydrogen in the presence of an active hydrogenation catalyst other than any catalytically active aluminum halide which may be present in said sludge and in the substantial absence of other regenerating agents at a temperature within the approximate range of from 200° to 500° F. and a pressure within the approximate range of from 40 to 400 atmospheres.

JAMES M. PAGE, Jr.